(12) United States Patent
Sato et al.

(10) Patent No.: US 10,907,570 B2
(45) Date of Patent: Feb. 2, 2021

(54) CYLINDRICAL MEMBER

(71) Applicants: TPR Co., Ltd., Tokyo (JP); TPR Industry Co., Ltd., Yamagata (JP)

(72) Inventors: Akira Sato, Yamagata (JP); Takashi Sato, Yamagata (JP); Mako Abe, Yamagata (JP)

(73) Assignees: TPR Co., Ltd., Tokyo (JP); TPR Industry Co., Ltd., Yamagata (JP)

(*) Notice: Subject to any disclaimer, the term of this patent is extended or adjusted under 35 U.S.C. 154(b) by 29 days.

(21) Appl. No.: 16/491,135

(22) PCT Filed: Dec. 12, 2018

(86) PCT No.: PCT/JP2018/045632
§ 371 (c)(1),
(2) Date: Sep. 4, 2019

(87) PCT Pub. No.: WO2019/225038
PCT Pub. Date: Nov. 28, 2019

(65) Prior Publication Data
US 2020/0392921 A1 Dec. 17, 2020

(30) Foreign Application Priority Data

May 24, 2018 (JP) .................. 2018-099656
Oct. 30, 2018 (JP) .................. 2018-203418
Nov. 15, 2018 (JP) .................. 2018-214320

(51) Int. Cl.
*B23P 11/00* (2006.01)
*F02F 1/00* (2006.01)
(Continued)

(52) U.S. Cl.
CPC .............. *F02F 1/004* (2013.01); *B22D 19/08* (2013.01); *F16J 10/04* (2013.01); *F02F 2200/06* (2013.01)

(58) Field of Classification Search
CPC ........ B22D 19/0081; F02F 1/004; F02F 1/16; F02F 1/102; F02F 2200/06; Y10T 29/49272
(Continued)

(56) References Cited

U.S. PATENT DOCUMENTS 7,383,805 B2 * 6/2008 Michioka ........... B22D 19/0009
123/193.2
2005/0161187 A1 * 7/2005 Kodama .................. F02F 7/00
164/66.1
(Continued)

FOREIGN PATENT DOCUMENTS

JP 2005-194983 A 7/2005
JP 2007-015005 A 1/2007
(Continued)

OTHER PUBLICATIONS

International Patent Application No. PCT/JP2018/045632, International Search Report and Written Opinion, dated Jan. 22, 2019.
Japanese Patent Application No. 2019-510982, Decision to Grant a Patent, dated Mar. 18, 2019.

*Primary Examiner* — Long T Tran
*Assistant Examiner* — James J Kim
(74) *Attorney, Agent, or Firm* — Marshall, Gerstein & Borun LLP (57) ABSTRACT

To provide a cast iron cylindrical member capable of improving the bonding strength when metal on the outer peripheral side and the cast iron cylindrical member are integrated. For this objective, in a cast iron cylindrical member including a plurality of projections including constricted projections on the outer peripheral surface, the anchor portion index (I) represented by $\{(A_{av}^2 - B_{av}^2) \times \pi/4 \times Pn \times Pr/100\} \times 0.35H/2$ is set in a specific range.

12 Claims, 6 Drawing Sheets

(51) Int. Cl.
*F16J 10/04* (2006.01)
*B22D 19/08* (2006.01)

(58) Field of Classification Search
USPC .................. 29/888.061; 123/193.2; 92/171.1
See application file for complete search history.

(56) References Cited

U.S. PATENT DOCUMENTS

| | | | |
|---|---|---|---|
| 2007/0009669 A1* | 1/2007 | Miyamoto | B22D 19/0009 427/446 |
| 2007/0012178 A1* | 1/2007 | Takami | B22D 19/0009 92/171.1 |
| 2007/0240652 A1 | 10/2007 | Michioka et al. | |
| 2009/0272261 A1* | 11/2009 | Sato | F02F 1/004 92/169.1 |
| 2012/0304852 A1 | 12/2012 | Yamagata et al. | |
| 2015/0122118 A1* | 5/2015 | He | B22D 13/02 92/171.1 |
| 2019/0358701 A1* | 11/2019 | Sayama | B22D 19/08 |

FOREIGN PATENT DOCUMENTS

| | | |
|---|---|---|
| JP | 2007-016733 A | 1/2007 |
| JP | 2009-264347 A | 11/2009 |
| JP | 2011-194407 A | 10/2011 |
| WO | WO-2015/002289 A1 | 1/2015 |

\* cited by examiner

Fig. 6

CYLINDRICAL MEMBER

TECHNIQUE FIELD

The present invention relates to a cast iron cylindrical member such as a cylinder liner.

BACKGROUND OF THE INVENTION

The cast iron cylindrical member is used as a cylinder liner of an internal combustion engine, a brake drum of an internal-expanding drum brake, a bearing member or a support member, or the like.

A cast iron cylindrical member is insert-cast with a metal material on the outer peripheral surface, and the metal on the outer peripheral side and the cast iron cylindrical member are integrated. In order to maintain the bonding strength when integrated, a plurality of projections is provided on the outer peripheral surface of the cast iron cylindrical member (see, for example, Patent Documents 1 and 2).

CITATION LIST

Patent Documents

Patent Document 1 Japanese Patent Application Publication No. 2005-194983
Patent Document 2 Japanese Patent Application Publication No. 2009-264347

SUMMARY OF INVENTION

Technical Problem to be Solved by the Invention

In Patent Documents 1 and 2 above, it has been studied that, for a plurality of projections present on the outer peripheral surface of a cast iron cylindrical member, the number of projections, the height of the projections, and the area ratio at a specific height from the outer peripheral bottom of the projections are made optimum. On the other hand, it is disclosed that some of the projections have a constricted shape, that is, a shape with a thick tip and a narrow middle portion, but the details are still unknown.

An object of the present invention is to increase the bonding strength when a metal on the outer peripheral side and a cast iron cylindrical member are integrated by a method different from those of Patent Documents 1 and 2.

Solution to Problem

In order to solve the above-described problems, the present inventors examined to find out that the constricted shape of a projection was very important to the bonding strength. Various conditions at the time of forming a projection were examined, and it was found that the above-described problems can be solved by including a projection of a specific shape on the outer peripheral surface of a cast iron cylindrical member, and the present invention was completed.

The present invention is a cylindrical member made of cast iron which has a plurality of projections including constricted projections on the outer peripheral surface, and which satisfies the following (i).
(i) Let the number of projections per 100 mm$^2$ be Pn, the constriction rate of a projection be Pr, the average of the maximum thickness of 20 arbitrary projections among the constricted projections be $A_{av}$ (mm), and the average of the minimum thicknesses of the 20 arbitrary projections be $B_{av}$ (mm), $$0.03 \leq (A_{av}^2 - B_{av}^2) \times \pi/4 \times Pn \times Pr/100$$

is satisfied.
Note that the constriction rate Pr of the projections is (the number of constricted projections per 100 mm$^2$/Pn).

The present inventors further studied the shape of the projection, and also arrived at that specific portion in the height direction of a projection is particularly important in improving the bonding strength.

Another aspect of the present invention is a cast iron cylindrical member including a plurality of projections including constricted projections on the outer peripheral surface, wherein the average height H of the formed projections is from 0.3 mm to 1.0 mm, the number Pn of projections per 100 mm$^2$ is from 20 to 110, and which satisfies the following (I).
(I) Let the number of projections per 100 mm$^2$ be Pn, the constriction rate of a projection be Pr, the average height of the projections be H (mm), the average of the maximum thickness of 20 arbitrary projections among the constricted projections be $A_{av}$ (mm), and the average of the minimum thicknesses of the 20 arbitrary projections be $B_{av}$ (mm), $$0.0025 \leq \{(A_{av}^2 - B_{av}^2) \times \pi/4 \times Pn \times Pr/100\} \times 0.35H/2$$

is satisfied.
Note that the constriction rate Pr of the projections is (the number of constricted projections per 100 mm$^2$/Pn).

In the above (i) and (I), the constriction rate Pr of a projection is preferably 0.7 or more, and the projection preferably further satisfies the following (ii).

$$1.1 \leq (A_{av}/B_{av}) \leq 2.5 \tag{ii}$$

Another aspect of the present invention is a composite structure including: the cast iron cylindrical member described above; and an outer peripheral member that insert-casts the cast iron cylindrical member.

Still another aspect of the invention is a method of manufacturing a composite structure including a cast iron cylindrical member and an outer peripheral member that insert-casts the cast iron cylindrical member,
the method including: a process of forming a plurality of projections including constricted projections on an outer peripheral surface of a cast iron cylindrical member; and a process of insert-casting the cylindrical member having the projections formed thereon by an outer peripheral member,
the formed projection satisfies the following (i) and/or (I).
(i) Let the number of projections per 100 mm$^2$ be Pn, the constriction rate of a projection be Pr, the average of the maximum thickness of 20 arbitrary projections among the constricted projections be $A_{av}$ (mm), and the average of the minimum thicknesses of the 20 arbitrary projections be $B_{av}$ (mm), $$0.03 \leq (A_{av}^2 - B_{av}^2) \times \pi/4 \times Pn \times Pr/100$$

is satisfied.
Note that the constriction rate Pr of the projections is (the number of constricted projections per 100 mm$^2$/Pn).
(I) Let the number of projections per 100 mm$^2$ be Pn, the constriction rate of a projection be Pr, the average height of the projections be H (mm), the average of the maximum thickness of 20 arbitrary projections among the constricted projections be $A_{av}$ (mm), and the average of the minimum thicknesses of the 20 arbitrary projections be $B_{av}$ (mm), $$0.0025 \leq \{(A_{av}^2 - B_{av}^2) \times \pi/4 \times Pn \times Pr/100\} \times 0.35H/2$$

is satisfied.

Note that the constriction rate Pr of the projections is (the number of constricted projections per 100 mm$^2$/Pn).

Still another aspect of the invention is a method of improving the bonding strength of a composite structure including a cast iron cylindrical member and an outer peripheral member that insert-casts the cast iron cylindrical member, the method including: a process of forming a plurality of projections including constricted projections on an outer peripheral surface of a cast iron cylindrical member; and a process of insert-casting the cylindrical member having the projections formed thereon by an outer peripheral member, the formed projection satisfies the following (i) and/or (I).

(i) Let the number of projections per 100 mm$^2$ be Pn, the constriction rate of a projection be Pr, the average of the maximum thickness of 20 arbitrary projections among the constricted projections be $A_{av}$ (mm), and the average of the minimum thicknesses of the 20 arbitrary projections be $B_{av}$ (mm), $$0.03 \leq (A_{av}^2 - B_{av}^2) \times \pi/4 \times Pn \times Pr/100$$

is satisfied.

Note that the constriction rate Pr of the projections is (the number of constricted projections per 100 mm$^2$/Pn).

(I) Let the number of projections per 100 mm$^2$ be Pn, the constriction rate of a projection be Pr, the average height of the projections be H (mm), the average of the maximum thickness of 20 arbitrary projections among the constricted projections be $A_{av}$ (mm), and the average of the minimum thicknesses of the 20 arbitrary projections be $B_{av}$ (mm), $$0.0025 \leq \{(A_{av}^2 - B_{av}^2) \times \pi/4 \times Pn \times Pr/100\} \times 0.35 H/2$$

is satisfied.

Note that the constriction rate Pr of the projections is (the number of constricted projections per 100 mm$^2$/Pn).

Advantageous Effects of Invention

According to the present invention, it is possible to provide a cast iron cylindrical member capable of improving the bonding strength when metal on the outer peripheral side and the cast iron cylindrical member are integrated.

DESCRIPTION OF EMBODIMENTS

One embodiment of the present invention is a cylindrical member made of cast iron which has a plurality of projections including constricted projections on the outer peripheral surface, and which satisfies the following (i).

(i) Let the number of projections per 100 mm$^2$ be Pn, the constriction rate of a projection be Pr, the average of the maximum thickness of 20 arbitrary projections among the constricted projections be $A_{av}$ (mm), and the average of the minimum thicknesses of the 20 arbitrary projections be $B_{av}$ (mm), $$0.03 \leq (A_{av}^2 - B_{av}^2) \times \pi/4 \times Pn \times Pr/100$$

is satisfied.

Note that the constriction rate Pr of the projections is (the number of constricted projections per 100 mm$^2$/Pn).

In the present embodiment, the plurality of projections that the cast iron cylindrical member includes on the outer peripheral surface thereof include projections having a constricted shape. A projection having a constricted shape will be described with reference to FIG. 1.

Figure 1:
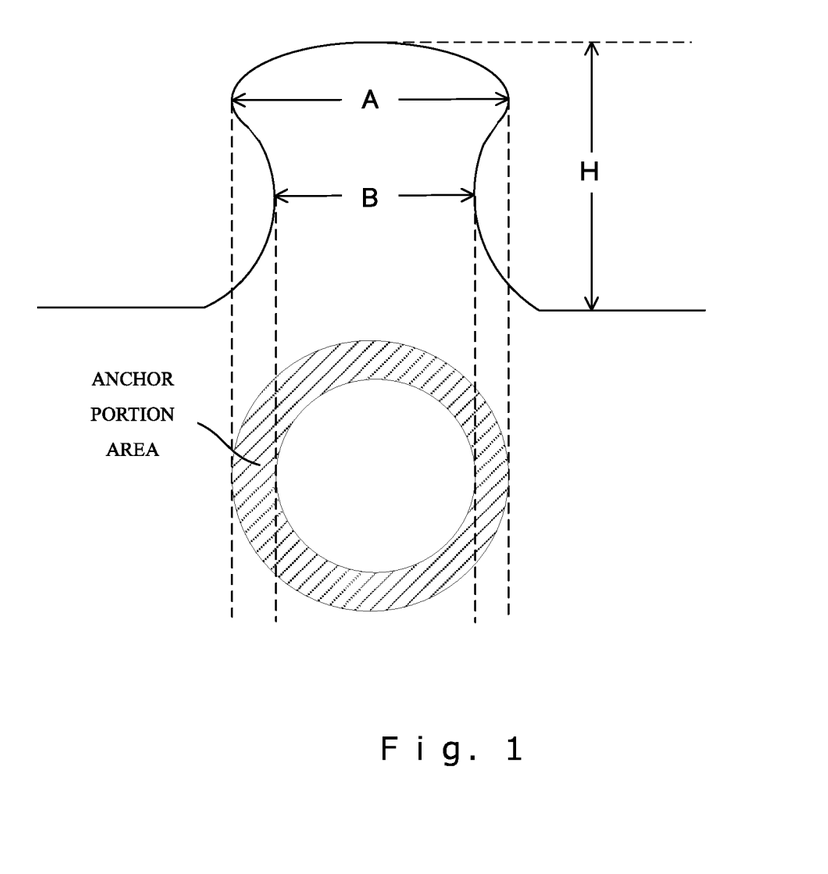
FIG. 1 is a schematic sectional view of a constricted projection for explaining an anchor portion index (i).
Figure 2:
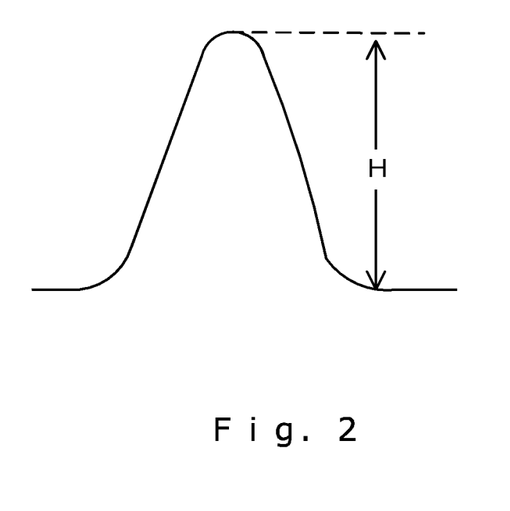
FIG. 2 is a schematic sectional view of another projection without a constriction.

FIG. 1 is an enlarged schematic sectional view showing an example of a projection having a constricted shape. FIG. 2 is an enlarged sectional schematic view showing an example of a projection having another shape which is not constricted.

The constricted projection has a height H from a base surface of the outer peripheral surface, and typically the thickness gradually decreases from the base surface in the height direction, and the minimum thickness is B. The thickness then gradually increases in the height direction, and has a maximum thickness A. In this manner, a projection having a minimum thickness B and a maximum thickness A in this order from the base surface of the projection in the height direction is herein referred to as a constricted projection.

The present inventors paid attention to the shape of the constricted projection in order to improve the bonding strength when the metal on the outer peripheral side and the cast iron cylindrical member are integrated. As a result, it was found that letting the number of projections per 100 mm$^2$ be Pn, the constriction rate of a projection be Pr, the average of the maximum thickness of 20 arbitrary projections among the constricted projections be $A_{av}$ (mm), and the average of the minimum thicknesses of the 20 arbitrary projections be $B_{av}$ (mm), defining $(A_{av}^2 - B_{av}^2) \times \pi/4 \times Pn \times Pr/100$ be an anchor portion index (i), and by making the anchor portion index (i) in a specific range, the bonding strength when the outer peripheral member and the cast iron cylindrical member are integrated can be improved. The area of the anchor portion (i) is indicated by hatching in FIG. 1.

The constriction rate Pr of the projections is (the number of constricted projections per 100 mm$^2$/Pn).

The anchor portion index (i) is 0.03 or more, and may be 0.04 or more, 0.05 or more, or 0.06 or more, and the upper limit is not particularly limited, and may be 0.25 or less, 0.22 or less, 0.20 or less, 0.18 or less, 0.16 or less, 0.15 or less, 0.14 or less, 0.13 or less, or 0.12 or less. From the viewpoint of improving running of molten metal, the anchor portion index (i) is preferably 0.25 or less.

On the other hand, the present inventors further studied the shape of the projection, and thought that a specific place in the height direction of the projection was particularly important for the bonding strength. This will be described with reference to FIG. 3.

The anchor portion (i) area shown in FIG. 1 indicates the difference in area between a circle whose diameter is the maximum thickness A and a circle whose diameter is the minimum thickness B. The anchor portion index (i) is a value calculated using the area difference.

Figure 3:
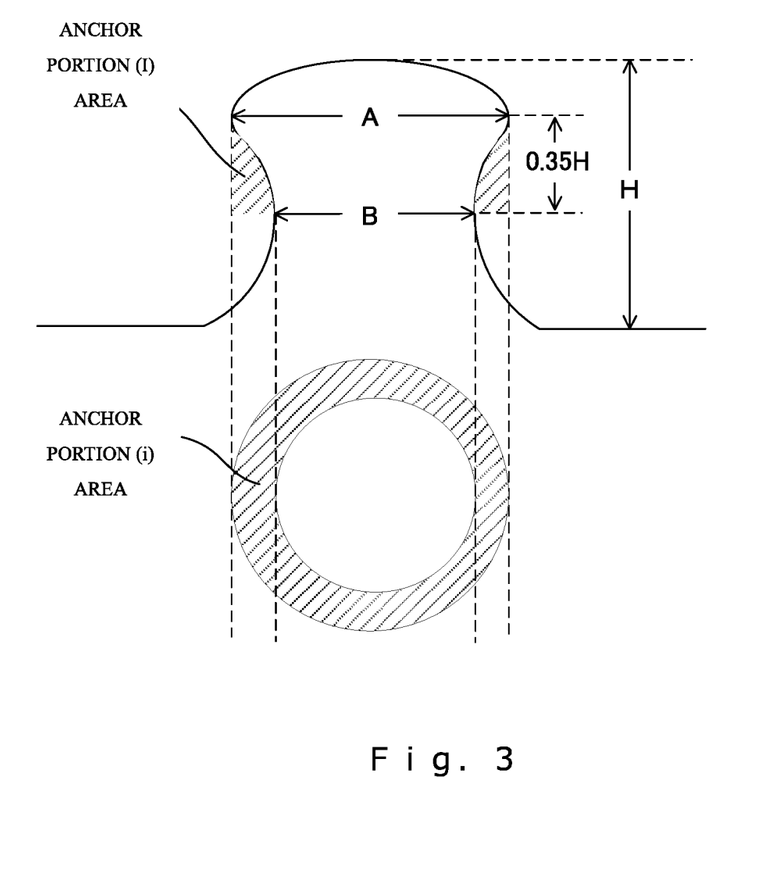
FIG. 3 is a schematic sectional view of a constricted projection for explaining an anchor portion index (I).

On the other hand, focusing on the height direction of the projection, a portion that greatly contributed to improvement of the bonding strength was the area of a portion of the projection between the maximum thickness A and the minimum thickness B, that is an anchor portion (I) indicated by hatching in FIG. 3. Then, it was derived that the distance between the maximum thickness A and the minimum thickness B contributing to the bonding strength relative to the heights H (mm) of the projection was 0.35H on average, and by incorporating the parameters into the anchor portion index (i), the following new anchor portion index (I) using the anchor portion (I) area was found.

Specifically, the anchor portion index (I) is represented by $\{(A_{av}^2-B_{av}^2)\times\pi/4\times Pn\times Pr/100\}\times 0.35H/2$, letting the number of projections per 100 mm² be Pn, the constriction rate of a projection be Pr, the average height of the projections be H (mm), the average of the maximum thickness of 20 arbitrary projections among the constricted projections be $A_{av}$ (mm), and the average of the minimum thicknesses of the 20 arbitrary projections be $B_{av}$ (mm), and the anchor portion index (I) is 0.0025 or more in the present embodiment.

Note that the constriction rate Pr of the projections is (the number of constricted projections per 100 mm²/Pn).

The anchor portion index (I) may be 0.003 or more, 0.004 or more, 0.006 or more, 0.008 or more, or 0.01 or more, and the upper limit is not particularly limited, and may be 0.04 or less, 0.035 or less, 0.03 or less, or 0.025 or less.

The present inventors also thought that when the constricted shape of the anchor portion defined by $A_{av}/B_{av}$ is within a certain range, it is possible to further improve the bonding strength when the outer peripheral member and the cast iron cylindrical member are integrated. The constricted shape of the anchor portion is usually 1.1 or more, and may be 1.2 or more, 1.3 or more, 1.4 or more, or 1.5 or more. The constricted shape of the anchor portion may be 2.5 or less, 2.4 or less, 2.3 or less, 2.2 or less, or 2.0 or less.

The average $A_{av}$ of the maximum thickness of the projections having a constricted shape may be usually 0.3 mm or more, 0.4 mm or more, 0.5 mm or more, or 0.6 mm or more. The average $A_{av}$ of the maximum thickness of the projections having a constricted shape may be usually 1.5 mm or less, 1.4 mm or less, 1.3 mm or less, 1.2 mm or less, or 1.0 mm or less.

The average $B_{av}$ of the minimum thickness may be usually 0.1 mm or more, 0.2 mm or more, 0.3 mm or more, or 0.4 mm or more. The average $B_{av}$ of the minimum thickness may be usually 1.2 mm or less, 1.1 mm or less, 1.0 mm or less, 0.9 mm or less, or 0.8 mm or less.

The constriction rate Pr of the projections is usually 50% or more, 60% or more, 70% or more, 80% or more, 90% or more, 92% or more, 94% or more, 95% or more, 96% or more, 97% or more, 98% or more, or 99% or more. Here, the constriction rate of the projections is expressed in percentage (Pr×100). Although generally, when the height of a projection is low, the constriction rate tends to be low, in the present embodiment, even when the height of the projection is low, the anchor portion index can be increased by increasing the constriction rate, and the high bonding strength can be achieved.

The average height H (mm) of the projections of the cast iron cylindrical member is not particularly limited, and usually, may be 0.3 mm or more or 0.4 mm or more, and may be 1.0 mm or less or 0.9 mm or less. In one example, the average height H (mm) of the projections of the cast iron cylindrical member may be 0.3 mm or more and less than 0.6 mm, 0.3 mm or more and 0.55 mm or less, 0.3 mm or more and less than 0.5, 0.3 mm or more and 0.5 mm or less, or 0.6 mm or more and 1.0 or less.

The number of projections per 100 mm² is usually 5 or more, and may be 10 or more, or 20 or more, and is usually 200 or less, and may be 180 or less, or 110 or less. In one example, the number of projections per 100 mm² may be from 5 to 60, from 20 to 11, from 70 to 150, or from 61 to 180.

The constricted shape of the projection can be determined by observation with a microscope. More specifically, a projection is observed at an angle of about 45° with respect to a line extending through the center point of the cylindrical member to a measurement point of the outer peripheral surface of the cylindrical member. By observing the projections, it is possible to measure the maximum thickness A, the minimum thickness B, or the like of the projections. The thickness of the projections herein can be reworded as the width of the observed projections. The observation method will be more specifically described with reference to FIG. 4.

Figure 4:
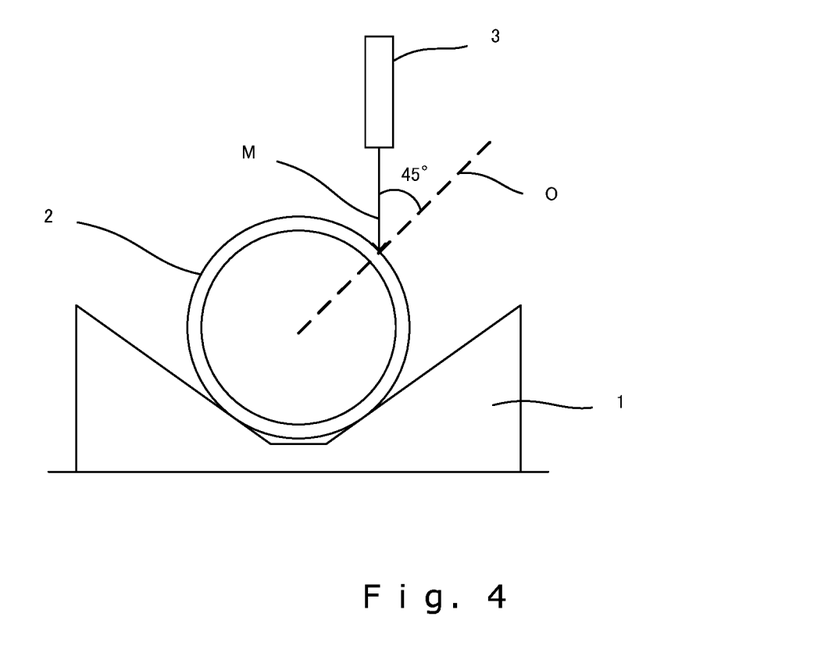
FIG. 4 is a schematic view showing an outline of observation of a projection by a microscope.

An evaluation cylindrical member 2 was arranged on a block table 1. A microscope 3 connected to a television monitor (not shown) was arranged diagonally above the evaluation cylindrical member 2 in such a manner that the optical axis M of the microscope 3 was parallel to the vertical direction. The projections formed on the surface of the cylindrical member 2 are observed in such a manner that the point of intersection between the optical axis M of the microscope 3 and the outer peripheral surface of the cylindrical member 2 to be measured has the angle of about 45° between the optical axis M and a line O extending through the center point of the cylindrical member 2 to the measurement point on the outer peripheral surface.

Although the use of the cast iron cylindrical member of the present embodiment is not particularly limited, the cast iron cylindrical member is typically used as a cylinder liner or a brake drum. By covering at least a part of the outer peripheral surface of the cast iron cylindrical member with the outer peripheral member, a composite structure of the cast iron cylindrical member and the outer peripheral member is obtained, and the composite structure is used for various applications. Such a composite structure is preferably a composite structure in which a cast iron cylindrical member is insert-cast with an outer member.

The outer member is not particularly limited, and a material that solidifies when cooled from a high temperature state, a liquid material that cures by a polymerization reaction, or a powdery raw material that is fused or sintered by heating can be used. Typical examples thereof include a molten metal using an aluminum alloy or the like.

An example of the manufacturing method of the cast iron cylindrical member of the present embodiment will be described below.

The composition of cast iron which is to be a material of a cast iron cylindrical member is not particularly limited, and can be appropriately selected according to the application of the cylindrical member. Typically, the composition shown below can be exemplified as a composition of flake graphite cast iron equivalent to JIS FC250 in consideration of wear resistance, seizure resistance and processability.

C: from 3.0 to 3.7% by mass
Si: from 2.0 to 2.8% by mass
Mn: from 0.5 to 1.0% by mass
P: 0.25% by mass or less
S: 0.15% by mass or less
Cr: 0.5% by mass or less
Balance: Fe and inevitable impurities The method of manufacturing a cast iron cylindrical member is not particularly limited, and is preferably by centrifugal casting, and typically includes the following processes A to E.

<Process A: Suspension Preparation Process>

A process A is a process of preparing a suspension by blending a fire-resistant base material, a binder, and water in a predetermined ratio.

Typically, diatomaceous earth is used for the fire-resistant base material, but is not limited thereto. The content of diatomaceous earth in the suspension is usually 20% by mass or more and 35% by mass or less, and the average particle diameter of the diatomaceous earth is usually 2 μm or more and 35 μm or less.

Typically, bentonite is used as a binder, but is not limited thereto. The content of bentonite in the suspension is usually 3% by mass or more and 9% by mass or less.

The content of water in the suspension is usually 62% by mass or more and 78% by mass or less.

<Process B: Mold Wash Preparation Process>

A process B is a process in which a mold wash is prepared by adding a predetermined amount of surfactant to the suspension prepared in the process A.

The type of surfactant is not particularly limited, and known surfactants may be used. The blending amount of surfactant is usually 0.005 parts by mass or more and 0.04 parts by mass or less with respect to 100 parts by mass of the suspension.

<Process C: Mold Wash Application Process>

A process C is a process of applying a mold wash to the inner peripheral surface of a cylindrical mold as a mold. Although the application method is not particularly limited, spray application is typically used. At the time of application of the mold wash, it is preferable that the mold wash be applied in such a manner that the layer of the mold wash is formed to have a substantially uniform thickness over the entire inner peripheral surface. When applying a mold wash and forming a mold wash layer, it is preferable to apply an appropriate centrifugal force by rotating a cylindrical mold.

The present inventors speculate that projections present on the surface of the cylindrical member is formed through the following process.

Specifically, in a mold wash layer formed on the inner peripheral surface of a mold heated to a predetermined temperature, water in the mold wash evaporates rapidly to generate air bubbles. Then, a concave hole is formed on the inner peripheral side of the mold wash layer by the action of a surfactant on relatively large bubbles or by the relatively small bubbles being combined. The mold wash layer is gradually dried from the inner peripheral surface of the mold, and in a process of gradually solidifying the mold wash layer forming the concave hole, the concave hole having a shape constricted in the mold wash layer is formed.

The thickness of the mold wash layer is preferably selected in the range of from 1.1 to 2.0 times the height of the projections, but is not limited thereto. When the thickness of the mold wash layer is this thickness, the temperature of the mold is preferably 300° C. or less.

<Process D: Cast Iron Casting Process>

A process D is a process of casting cast iron into a mold in a rotating state having a dried mold wash layer. At this time, a concave hole having a constricted shape of the mold wash layer described in the previous process is filled with molten metal, and as a result, a constricted projection is formed on the surface of a cylindrical member. Also in this case, it is preferable to apply an appropriate centrifugal force.

<Process E: Take Out, Finishing Process>

In a process E, the manufactured cylindrical member is removed from the mold, the mold wash layer on the surface of the cylindrical member is removed from the cylindrical member by blasting, and the cylindrical member is completed.

Through the above processes, a cast iron cylindrical member is completed, and it is necessary to form many constricted projections on the surface of the cylindrical member in order to make the anchor portion index within a specific range. For this purpose, it is necessary to appropriately adjust the amount of water in the process A, the amount of a surfactant in the process B, the thickness of the mold wash layer, Gno in the formation of the mold wash layer, Gno in cast iron casting, and the like. Specifically, by setting An amount of water in the process A: from 65% by mass to 75% by mass An amount of a surfactant in the process B: from 0.005% by mass to 0.04% by mass The thickness of the mold wash layer: from 0.5 mm to 1.1 mm Gno (lining): from 20 G to 80 G Gno (casting): from 80 G to 160 G, or the like, it becomes easy to make the anchor portion index of the projection on the surface of the cylindrical member within a specific range.

Gno (lining) indicates G (centrifugal force) when the cylindrical mold is rotated when forming a mold wash layer in the process C, and Gno (casting) indicates G (centrifugal force) when the mold is rotated in the process D.

In the present embodiment, the bonding strength of a composite structure including a cylindrical member, and an outer peripheral member for insert-casting the cylindrical member can be improved by adjusting the projections on the surface of the cylindrical member in such a manner that the anchor portion index is in a specific range.

EXAMPLES

Hereinafter, the present invention will be described in more detail by way of Examples, but the present invention is not limited to the following Examples.

The measuring method used in the present Example is as follows.

<Average Height of Projections>

The average height of the projections (hereinafter also simply referred to as "height of projections") was measured by a dial depth gauge (the smallest unit is 0.01 mm). The measurement was performed at two diametrically opposed positions near both axial end portions of the cylindrical member, and the average of these four positions was taken as the height H (mm) of projections.

<Number of Projections>

The number of projections was obtained by measuring the outer peripheral surface of the cylindrical member using a non-contact 3D laser measuring instrument and obtaining a contour map of 1 cm×1 cm, and then counting the number of regions surrounded by contour lines with a height of 300 μm in this contour map. Similar to the measurement of the height of the projections, the measurement was performed at two diametrically opposed positions near both axial end portions of the cylindrical member, and the average of these four positions was defined as the number Pn of projections per 100 mm².

<Constriction Rate, Maximum Thickness of Projections, Minimum Thickness>

The constriction rate was determined by observing a projection using a microscope (Digital Microscope KH-1300 manufactured by HIROX Co., Ltd.) and observing whether the projection was a constricted projection, and dividing the number of constricted projections per 100 mm² by Pn to obtain a constriction rate Pr.

Similarly, by observing the projections, the maximum thickness A and the minimum thickness B of 20 arbitrary projections are determined, and the averages were defined respectively as $A_{av}$ and $B_{av}$.

<Anchor Portion Index (i), Anchor Portion Index (I), Anchor Portion Constricted Shape>

Using the values of $A_{av}$, $B_{av}$, Pn, and Pr measured above, $(A_{av}^2-B_{av}^2) \times \pi/4 \times Pn \times Pr/100$ was defined as the anchor portion index (i), the height H of the projection was added and $\{(A_{av}^2-B_{av}^2) \times \pi/4 \times Pn \times Pr/100\} 0.35 H/2$ was defined as the anchor portion index (I), and $(A_{av}/B_{av})$ was defined as the anchor portion constricted shape.

<Bonding Strength>

Using a tensile tester (manufactured by Shimadzu Corporation, universal tester: AG-5000E), one of the cylindrical member and the outer peripheral member was fixed by a clamp, and tensile strength was applied in the direction orthogonal to the bonding surface of the other two members. The tensile strength when both members peeled off was taken as the bonding strength.

Experiment 1:

Preparation of Mold Wash

Mold washes 1-6 were prepared using raw materials shown in Table 1 below.

Preparation of Cast Iron Cylindrical Member

Cast iron cylindrical members of Examples and Comparative Examples were produced by centrifugal casting using molten metal of the same composition. The composition of the cast iron cylindrical members cast was
C: 3.4% by mass,
Si: 2.4% by mass,
Mn: 0.7% by mass,
P: 0.12% by mass,
S: 0.035% by mass,
Cr: 0.25% by mass, and
balance: Fe and inevitable impurities Z (equivalent to JIS FC250).

Cylindrical members according to Examples 1 to 5 and Comparative Example 1 were produced using the mold washes shown in Table 1. In any of Examples, the temperature of the cylindrical mold in the process C was set in the range of from 180° C. to 300° C., and the mold wash layer was formed with Gno (lining) shown in Table 2. By changing as appropriate the thickness of the mold wash layer in each of the Examples, the heights of the projections were changed as appropriate. The process D and subsequent processes were performed under the same conditions in any of the Examples except that casting of cast iron was performed with Gno (casting) shown in Table 2. Thereafter, the inner peripheral surface of the obtained cast iron cylindrical member was cut, and the thickness was adjusted to 5.5 mm.

The dimensions of the cast iron cylindrical member thus obtained were 85 mm in outer diameter (the outer diameter including the height of the projections) and 74 mm in inner diameter (thickness 5.5 mm), and the axial length was 130 mm. The shape of the projections of the produced cylindrical member is shown in Table 3.

TABLE 1

| | COMPOSITION OF MOLD WASH | | | | |
|---|---|---|---|---|---|
| | COMPOSITION OF SUSPENSION | | | | |
| MOLD WASH | DIATOMACEOUS EARTH (% BY MASS) | AVERAGE PARTICLE DIAMETER (mm) | BENTONITE (% BY MASS) | WATER (% BY MASS) | SURFACTANT (PARTS BY MASS) |
| MOLD WASH 1 | 20.3 | 0.035 | 5.7 | BALANCE | 0.008 |
| MOLD WASH 2 | 20.3 | 0.035 | 5.7 | BALANCE | 0.009 |
| MOLD WASH 3 | 20.3 | 0.035 | 5.7 | BALANCE | 0.010 |
| MOLD WASH 4 | 20.3 | 0.035 | 5.7 | BALANCE | 0.011 |
| MOLD WASH 5 | 20.3 | 0.035 | 5.7 | BALANCE | 0.012 |
| MOLD WASH 6 | 20.3 | 0.035 | 5.7 | BALANCE | 0.006 |

TABLE 2

| | MOLD WASH TYPE | Gno (LINING) | Gno (CASTING) |
|---|---|---|---|
| EXAMPLE 1 | MOLD WASH 1 | 70 G | 80 G |
| EXAMPLE 2 | MOLD WASH 2 | 60 G | 100 G |
| EXAMPLE 3 | MOLD WASH 3 | 50 G | 120 G |
| EXAMPLE 4 | MOLD WASH 4 | 40 G | 140 G |
| EXAMPLE 5 | MOLD WASH 5 | 30 G | 160 G |
| COMPARATIVE EXAMPLE 1 | MOLD WASH 6 | 80 G | 60 G |

TABLE 3

| | HEIGT OF PROJECTIONS (mm) | NUMBER OF PROJECTIONS (/100 mm²) | CONSTRICTION RATE (%) | $A_{av}$ (mm) | $B_{av}$ (mm) | ANCHOR PORTION INDEX (i) | ANCHOR PORTION INDEX (I) | ANCHOR PORTION CONSTRICTED SHAPE |
|---|---|---|---|---|---|---|---|---|
| EXAMPLE 1 | 0.74 | 27 | 93 | 0.719 | 0.598 | 0.031 | 0.0040 | 1.20 |
| EXAMPLE 2 | 0.71 | 35 | 100 | 0.921 | 0.747 | 0.080 | 0.0099 | 1.23 |
| EXAMPLE 3 | 0.73 | 39 | 100 | 0.996 | 0.733 | 0.139 | 0.0178 | 1.36 |
| EXAMPLE 4 | 0.75 | 45 | 100 | 1.02 | 0.701 | 0.194 | 0.0255 | 1.46 |
| EXAMPLE 5 | 0.72 | 50 | 100 | 1.12 | 0.790 | 0.248 | 0.0312 | 1.42 |
| COMPARATIVE EXAMPLE 1 | 0.77 | 22 | 100 | 0.563 | 0.502 | 0.009 | 0.0012 | 1.12 |

*CONSTRICTION RATE IN THE TABLE IS EXPRESSED IN PERCENTAGE (Pr × 100)

Figure 5:
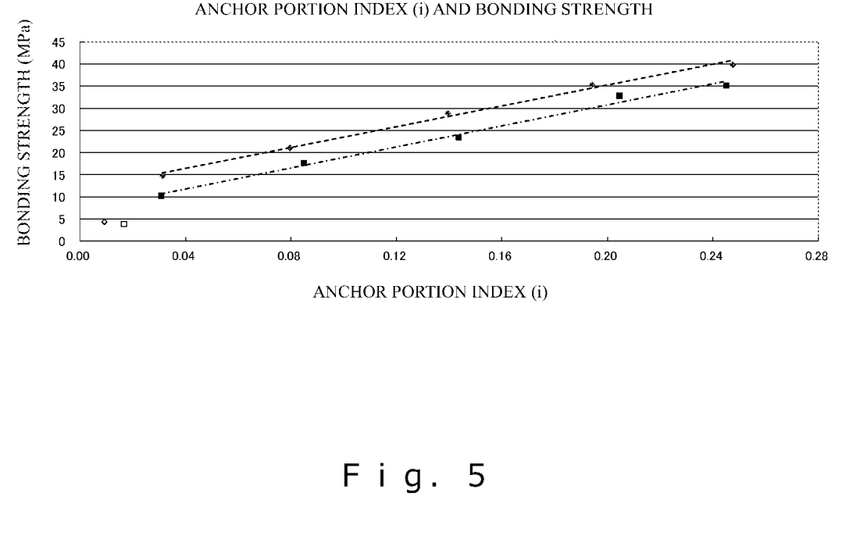
FIG. 5 is a graph showing the correlation between the anchor portion index (i) and the bonding strength.
Figure 6:
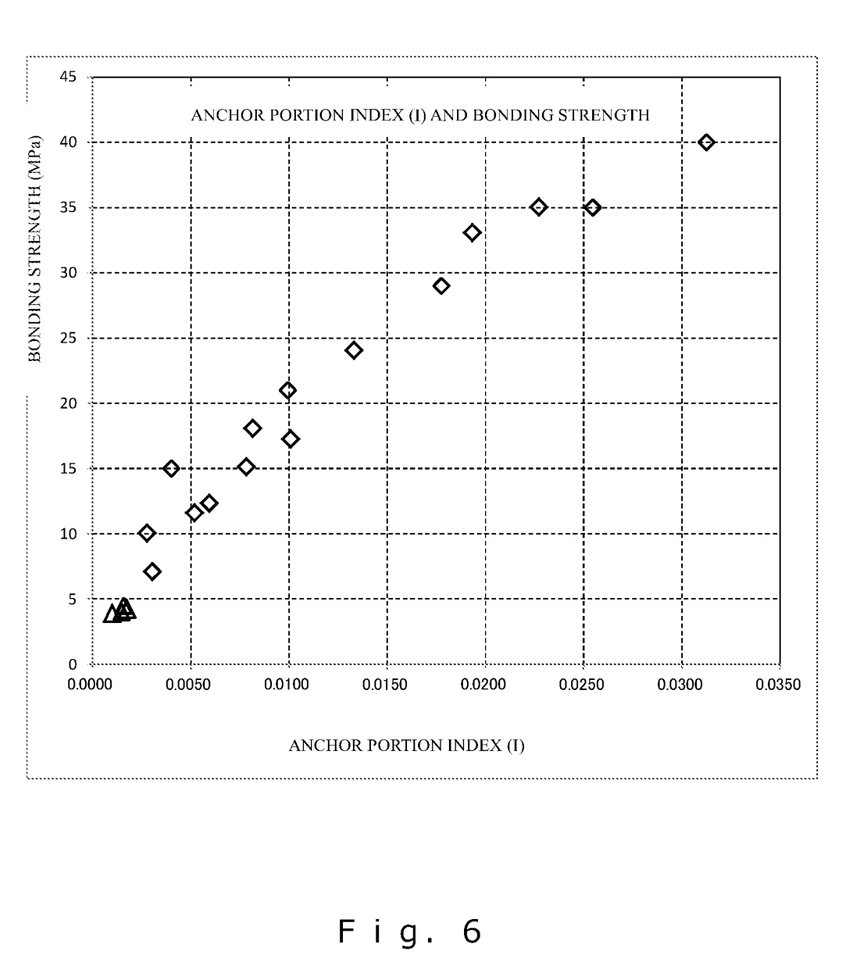
FIG. 6 is a graph showing the correlation between anchor portion index (I) and the bonding strength.

The cylindrical members according to Examples 1 to 5 and Comparative Example 1 were joined with an outer peripheral member (aluminum material) to form a composite. The bonding strength of the composite was measured, and a graph in which the anchor portion index (i) of the cylindrical member was plotted on the horizontal axis and the bonding strength between the cylindrical member and the outer peripheral member was plotted on the vertical axis (rhombus; Comparative Example is open) is shown in FIG. 5. A graph in which the anchor portion index (I) of the cylindrical member was plotted on the horizontal axis and the bonding strength between the cylindrical member and the outer peripheral member was plotted on the vertical axis is shown in FIG. 6 (Examples are indicated by ◇ and Comparative Examples are indicated by A). As is apparent from the dashed line in FIG. 5 and from FIG. 6, the bonding strengths were correlated with the anchor part indices (i) and (I) of the cylindrical member.

Experiment 2:
Preparation of Mold Wash
Mold washes 7-13 were prepared using raw materials shown in Table 4 below.

of the Examples except that casting of cast iron was performed with Gno (casting) shown in Table 5. Thereafter, the inner peripheral surface of the obtained cast iron cylindrical member was cut, and the thickness was adjusted to 5.5 mm.

The dimensions of the cast iron cylindrical member thus obtained were 85 mm in outer diameter (the outer diameter including the height of the projections) and 74 mm in inner diameter (thickness 5.5 mm), and the axial length was 130 mm. The shape of the projections of the produced cylindrical member is shown in Table 6.

TABLE 5

|  | MOLD WASH TYPE | Gno (LINING) | Gno (CASTING) |
| --- | --- | --- | --- |
| EXAMPLE 6 | MOLD WASH 7 | 80 G | 80 G |
| EXAMPLE 7 | MOLD WASH 8 | 70 G | 100 G |
| EXAMPLE 8 | MOLD WASH 9 | 60 G | 120 G |
| EXAMPLE 9 | MOLD WASH 10 | 50 G | 140 G |
| EXAMPLE 10 | MOLD WASH 11 | 40 G | 160 G |

TABLE 4

COMPOSITION OF MOLD WASH

COMPOSITION OF SUSPENSION

| MOLD WASH | DIATOMACEOUS EARTH (% BY MASS) | AVERAGE PARTICLE DIAMETER (mm) | BENTONITE (% BY MASS) | WATER (% BY MASS) | SURFACTANT (PARTS BY MASS) |
| --- | --- | --- | --- | --- | --- |
| MOLD WASH 7 | 21.9 | 0.017 | 6.1 | BALANCE | 0.008 |
| MOLD WASH 8 | 21.9 | 0.017 | 6.1 | BALANCE | 0.009 |
| MOLD WASH 9 | 21.9 | 0.017 | 6.1 | BALANCE | 0.010 |
| MOLD WASH 10 | 21.9 | 0.017 | 6.1 | BALANCE | 0.011 |
| MOLD WASH 11 | 21.9 | 0.017 | 6.1 | BALANCE | 0.012 |
| MOLD WASH 12 | 21.9 | 0.017 | 6.1 | BALANCE | 0.006 |
| MOLD WASH 13 | 21.9 | 0.017 | 6.1 | BALANCE | 0.004 |

The same cast iron cylindrical members as in Experiment 1 above were used.

Cylindrical members according to Examples 6 to 10 and Comparative Examples 2 and 3 were produced using the mold washes shown in Table 4. In any of Examples, the temperature of the cylindrical mold in the process C was set in the range of from 180° C. to 300° C., and the mold wash layer was formed with Gno (lining) shown in Table 5. By changing as appropriate the thickness of the mold wash layer in each of the Examples, the heights of the projections were changed as appropriate. The process D and subsequent processes were performed under the same conditions in any TABLE 5-continued

|  | MOLD WASH TYPE | Gno (LINING) | Gno (CASTING) |
| --- | --- | --- | --- |
| COMPARATIVE EXAMPLE 2 | MOLD WASH 12 | 90 G | 60 G |
| COMPARATIVE EXAMPLE 3 | MOLD WASH 13 | 80 G | 60 G |

TABLE 6

|  | HEIGT OF PROJECTIONS (mm) | NUMBER OF PROJECTIONS (/100 mm²) | CONSTRICTION RATE (%) | $A_{av}$ (mm) | $B_{av}$ (mm) | ANCHOR PORTION INDEX (i) | ANCHOR PORTION INDEX (I) | ANCHOR PORTION CONSTRICTED SHAPE |
| --- | --- | --- | --- | --- | --- | --- | --- | --- |
| EXAMPLE 6 | 0.52 | 73 | 70 | 0.632 | 0.568 | 0.031 | 0.0028 | 1.11 |
| EXAMPLE 7 | 0.55 | 80 | 85 | 0.696 | 0.570 | 0.085 | 0.0082 | 1.22 |
| EXAMPLE 8 | 0.53 | 90 | 98 | 0.754 | 0.601 | 0.144 | 0.0134 | 1.25 |
| EXAMPLE 9 | 0.54 | 102 | 100 | 0.801 | 0.622 | 0.205 | 0.0194 | 1.29 |
| EXAMPLE 10 | 0.53 | 108 | 100 | 0.845 | 0.652 | 0.245 | 0.0227 | 1.30 |
| COMPARATIVE EXAMPLE 2 | 0.53 | 58 | 63 | 0.616 | 0.567 | 0.017 | 0.0016 | 1.09 |
| COMPARATIVE EXAMPLE 3 | 0.52 | 28 | 100 | 0.577 | 0.483 | 0.0219 | 0.0020 | 1.19 |

*CONSTRICTION RATE IN THE TABLE IS EXPRESSED IN PERCENTAGE (Pr × 100)

Experiment 3:
Preparation of Mold Wash
Mold washes 14-20 were prepared using raw materials shown in Table 7 below.
[Table 7]

TABLE 7

| | COMPOSITION OF MOLD WASH | | | | |
|---|---|---|---|---|---|
| | COMPOSITION OF SUSPENSION | | | | |
| MOLD WASH | DIATOMACEOUS EARTH (% BY MASS) | AVERAGE PARTICLE DIAMETER (mm) | BENTONITE (% BY MASS) | WATER (% BY MASS) | SURFACTANT (PARTS BY MASS) |
| MOLD WASH 14 | 21.4 | 0.017 | 6.6 | BALANCE | 0.008 |
| MOLD WASH 15 | 21.4 | 0.017 | 6.6 | BALANCE | 0.010 |
| MOLD WASH 16 | 21.4 | 0.017 | 6.6 | BALANCE | 0.010 |
| MOLD WASH 17 | 21.4 | 0.017 | 6.6 | BALANCE | 0.013 |
| MOLD WASH 18 | 21.4 | 0.017 | 6.6 | BALANCE | 0.012 |
| MOLD WASH 19 | 21.4 | 0.017 | 6.6 | BALANCE | 0.008 |
| MOLD WASH 20 | 21.4 | 0.017 | 6.6 | BALANCE | 0.011 |

The same cast iron cylindrical members as in Experiment 1 above were used.

Cylindrical members according to Examples 11 to 15 and Comparative Examples 4 and 5 were produced using the mold washes shown in Table 7. In any of Examples, the temperature of the cylindrical mold in the process C was set in the range of from 180° C. to 300° C., and the mold wash layer was formed with Gno (lining) shown in Table 8. By changing as appropriate the thickness of the mold wash layer in each of the Examples, the heights of the projections were changed as appropriate. The process D and subsequent processes were performed under the same conditions in any of the Examples except that casting of cast iron was performed with Gno (casting) shown in Table 8. Thereafter, the inner peripheral surface of the obtained cast iron cylindrical member was cut, and the thickness was adjusted to 5.5 mm.

The dimensions of the cast iron cylindrical member thus obtained were 85 mm in outer diameter (the outer diameter including the height of the projections) and 74 mm in inner diameter (thickness 5.5 mm), and the axial length was 130 mm. The shape of the projections of the produced cylindrical member is shown in Table 9.

TABLE 8

| | MOLD WASH TYPE | Gno (LINING) | Gno (CASTING) |
|---|---|---|---|
| EXAMPLE 11 | MOLD WASH 14 | 70 G | 90 G |
| EXAMPLE 12 | MOLD WASH 15 | 70 G | 100 G |
| EXAMPLE 13 | MOLD WASH 16 | 60 G | 120 G |
| EXAMPLE 14 | MOLD WASH 17 | 80 G | 100 G |
| EXAMPLE 15 | MOLD WASH 18 | 70 G | 140 G |
| COMPARATIVE EXAMPLE 4 | MOLD WASH 19 | 90 G | 90 G |
| COMPARATIVE EXAMPLE 5 | MOLD WASH 20 | 100 G | 80 G |

TABLE 9

| | HEIGT OF PROJECTIONS (mm) | NUMBER OF PROJECTIONS (/100 mm$^2$) | CONSTRICTION RATE (%) | $A_{av}$ (mm) | $B_{av}$ (mm) | ANCHOR PORTION INDEX (i) | ANCHOR PORTION INDEX (I) | ANCHOR PORTION CONSTRICTED SHAPE |
|---|---|---|---|---|---|---|---|---|
| EXAMPLE 11 | 0.47 | 30 | 90 | 0.763 | 0.637 | 0.037 | 0.0031 | 1.20 |
| EXAMPLE 12 | 0.44 | 46 | 100 | 0.764 | 0.629 | 0.068 | 0.0052 | 1.21 |
| EXAMPLE 13 | 0.48 | 49 | 90 | 0.812 | 0.624 | 0.094 | 0.0079 | 1.30 |
| EXAMPLE 14 | 0.46 | 72 | 100 | 0.674 | 0.568 | 0.074 | 0.0060 | 1.19 |
| EXAMPLE 15 | 0.47 | 60 | 100 | 0.764 | 0.568 | 0.123 | 0.0101 | 1.35 |
| COMPARATIVE EXAMPLE 4 | 0.49 | 30 | 95 | 0.616 | 0.535 | 0.021 | 0.0018 | 1.15 |
| COMPARATIVE EXAMPLE 5 | 0.49 | 52 | 75 | 0.528 | 0.490 | 0.012 | 0.0010 | 1.09 |

*CONSTRICTION RATE IN THE TABLE IS EXPRESSED IN PERCENTAGE (Pr × 100)

A graph in which the anchor portion index (i) of the cylindrical members according to Examples 6 to 15 and Comparative Examples 2 to 5 was plotted on the horizontal axis and the bonding strength between the cylindrical member and the outer peripheral member was plotted on the vertical axis (square; Comparative Example is open) is shown in FIG. 5. A graph in which the anchor portion index (I) of the cylindrical member was plotted on the horizontal axis and the bonding strength between the cylindrical member and the outer peripheral member was plotted on the vertical axis is shown in FIG. 6 (Examples are indicated by ◇ and Comparative Examples are indicated by △). As is apparent from alternate long and short dashed lines in FIG. 5 and from FIG. 6, the bonding strengths were correlated with the anchor part indices (i) and (I) of the cylindrical member.

REFERENCE SIGNS LIST

1 Block table
2 Cylindrical member
3 Microscope

The invention claimed is:

1. A cast iron cylindrical member comprising a plurality of projections including constricted projections on the outer peripheral surface, wherein the average height H of the formed projections is from 0.3 mm to 1.0 mm, the number Pn of projections per 100 mm² is from 20 to 110, and which satisfies the following (I):

(I) letting the number of projections per 100 mm² be Pn, the constriction rate of a projection be Pr, the average height of the projections be H (mm), the average of the maximum thickness of 20 arbitrary projections among the constricted projections be $A_{av}$ (mm), and the average of the minimum thicknesses of the 20 arbitrary projections be $B_{av}$ (mm), $$0.0025 \leq \{(A_{av}^2 - B_{av}^2) \times \pi/4 \times Pn \times Pr/100\} \times 0.35 H/2$$

is satisfied, where the constriction rate Pr of the projections is (the number of constricted projections per 100 mm²/Pn).

2. The cylindrical member according to claim 1, wherein the constriction rate Pr of the projection in the (I) is 0.7 or more.

3. The cylindrical member according to claim 1, wherein the average height H of the projections is from 0.3 mm to less than 0.6 mm.

4. The cylindrical member according to claim 1, wherein the average height H of the projections is from 0.6 mm to 1.0 mm.

5. The cylindrical member according to claim 1, wherein the projection further satisfies the following (ii):

$$1.1 \leq (A_{av}/B_{av}) \leq 2.5, \quad \text{(ii)}$$

6. A composite structure comprising: the cast iron cylindrical member according to claim 1; and an outer peripheral member that insert-casts the cast iron cylindrical member.

7. A method of manufacturing a composite structure comprising a cast iron cylindrical member and an outer peripheral member that insert-casts the cast iron cylindrical member, the method comprising:

a process of forming a plurality of projections including constricted projections on an outer peripheral surface of a cast iron cylindrical member; and a process of insert-casting the cylindrical member having the projections formed thereon by an outer peripheral member, the average height H of the formed projections is from 0.3 mm to 1.0 mm, the number Pn of projections per 100 mm² is from 20 to 110, and the formed projection satisfies the following (I):

(I) letting the number of projections per 100 mm² be Pn, the constriction rate of a projection be Pr, the average height of the projections be H (mm), the average of the maximum thickness of 20 arbitrary projections among the constricted projections be $A_{av}$ (mm), and the average of the minimum thicknesses of the 20 arbitrary projections be $B_{av}$ (mm), $$0.0025 \leq \{(A_{av}^2 - B_{av}^2) \times \pi/4 \times Pn \times Pr/100\} \times 0.35 H/2$$

is satisfied, where the constriction rate Pr of the projections is (the number of constricted projections per 100 mm²/Pn).

8. The method of manufacturing a composite structure according to claim 7, wherein the constriction rate Pr of the projection in the (I) is 0.7 or more.

9. The method of manufacturing a composite structure according to claim 7, wherein the formed projection further satisfies the following (ii):

$$1.1 \leq (A_{av}/B_{av}) \leq 2.5, \quad \text{(ii)}$$

10. A method of improving the bonding strength of a composite structure comprising a cast iron cylindrical member and an outer peripheral member that insert-casts the cast iron cylindrical member, the method comprising: a process of forming a plurality of projections including constricted projections on an outer peripheral surface of a cast iron cylindrical member; and a process of insert-casting the cylindrical member having the projections formed thereon by an outer peripheral member, the average height H of the formed projections is from 0.3 mm to 1.0 mm, the number Pn of projections per 100 mm² is from 20 to 110, and the formed projection satisfies the following (I):

(I) letting the number of projections per 100 mm² be Pn, the constriction rate of a projection be Pr, the average height of the projections be H (mm), the average of the maximum thickness of 20 arbitrary projections among the constricted projections be $A_{av}$ (mm), and the average of the minimum thicknesses of the 20 arbitrary projections be $B_{av}$ (mm), $$0.0025 \leq \{(A_{av}^2 - B_{av}^2) \times \pi/4 \times Pn \times Pr/100\} \times 0.35 H/2$$

is satisfied, where
the constriction rate Pr of the projections is (the number of constricted projections per 100 mm²/Pn).

11. The method according to claim 10, wherein the constriction rate Pr of the projection in the (I) is 0.7 or more.

12. The method according to claim 10, wherein the formed projection further satisfies the following (ii):

$$1.1 \leq (A_{av}/B_{av}) \leq 2.5. \quad \text{(ii)}$$

* * * * *